United States Patent [19]

Shinohara et al.

[11] Patent Number: 5,010,431
[45] Date of Patent: Apr. 23, 1991

[54] FLYING-TYPE COMPOSITE MAGNETIC HEAD

[75] Inventors: Tadashi Shinohara, Chiyoda; Toshikazu Nishiyama, Fukaya; Kazumi Noguchi, Kamikawa; Hitoshi Iwata; Shigekazu Suwabe, both of Kumagaya, all of Japan

[73] Assignee: Hitachi Metals, Ltd., Tokyo, Japan

[21] Appl. No.: 302,419

[22] Filed: Jan. 27, 1989

[30] Foreign Application Priority Data

Jan. 28, 1988 [JP] Japan .................. 63-18382

[51] Int. Cl.$^5$ .............................................. G11B 5/60
[52] U.S. Cl. ...................................... 360/103; 360/119
[58] Field of Search ............... 360/103, 122, 125, 119

[56] References Cited

U.S. PATENT DOCUMENTS

| | | | |
|---|---|---|---|
| 3,562,444 | 2/1971 | Hoogendoorn | 179/100.2 |
| 3,823,416 | 3/1973 | Warner | 360/122 |
| 4,740,853 | 4/1988 | Mukae | 360/103 |
| 4,816,949 | 3/1989 | Yamada | 360/126 X |
| 4,819,113 | 4/1989 | Kubata | 360/122 X |

*Primary Examiner*—A. J. Heinz

[57] ABSTRACT

A flying-type composite magnetic head comprising a slider made of a non-magnetic ceramic and having side rails extending longitudinally on both lateral sides of the head; a slit extending longitudinally in one of the side rails; and a magnetic core. The magnetic core is constituted by a pair of core pieces bonded to each other with a first glass layer and fixed in the slit of the slider with a second glass layer on both sides of the magnetic core. The core pieces have flat opposing surfaces parallel to each other for defining a magnetic gap with at least one of the opposing surfaces formed with an Fe-Al-Si thin layer. The magnetic core is provided in its track surface with a notch for restricting a track width, the notch having a depth equal to or greater than the depth of the magnetic gap, and the remaining thickness of the first glass layer bonding the magnetic core pieces being equal to or greater than the thickness of the magnetic core.

23 Claims, 3 Drawing Sheets

FLYING-TYPE COMPOSITE MAGNETIC HEAD

BACKGROUND OF THE INVENTION

The present invention relates to a flying-type composite magnetic head for use in a magnetic disk drive in such a manner that it is slightly floating over a magnetic recording medium, and more particularly to a flying-type composite magnetic head having not only excellent recording-reproduction characteristics but also good flatness in its air-bearing surface.

As magnetic heads used for writing and reading information in magnetic disk apparatuses, flying-type magnetic heads as shown in U.S. Pat. No. 3,823,416 and Japanese Patent Publication No. 57-569 are widely used. Such a flying-type magnetic head is constituted by a slider, a tail end of which is provided with a magnetic gap, and the overall slider body is constituted by an oxide-type magnetic material with high permeability.

The flying-type magnetic head is in light contact with a magnetic disk by a spring force when the magnetic disk is stationary, but when the magnetic disk is rotating, a flow of air over the magnetic disk exerts an upward force to a lower surface of the slider, whereby the magnetic head floats over the magnetic disk. When the magnetic disk starts to rotate or stops, the magnetic head comes into sliding contact with the magnetic disk. The contact condition of the magnetic head with the magnetic disk when the magnetic disk is stopped will be explained in detail. First, the flow of surface air becomes gradually slow when the rotation speed of the magnetic disk is reduced. And when the magnetic head loses its floating force, it collides with the disk surface and jumps up by its reaction and then falls onto the disk surface again. Such movement is repeated and the magnetic head slides on the disk to finally stop. Accordingly, the magnetic head should withstand shocks at the time of start and stop, and such characteristics are sometimes called CSS characteristics [contact start stop characteristics].

Flying-type magnetic heads conventionally were constituted by ferrite which is an oxide-type magnetic material with high permeability have relatively good CSS characteristics. However, the ferrite has a small saturation magnetic flux density, so that sufficiently high recording densities cannot be achieved to recording media having high coercive forces. Specifically, even with Mn-Zn ferrite having a relatively high saturation magnetic flux density Bs, its Bs is at most 5000 G or so.

It was then found that to achieve Bs of 8000 G or more, a magnetic head is desirably provided with a thin magnetic metal layer in its magnetic gap. For instance, Japanese Patent Laid-Open No. 58-14311 proposes a flying-type magnetic head composed of ferrite and provided with a magnetic metal layer with high saturation magnetic flux density only in a magnetic gap portion thereof. However, in this magnetic head, a magnetic transformation part has large inductance after provided with coil windings, so that it has low resonance frequency. This means that it is disadvantageous in recording and reproducing at high frequency. Here, the large inductance is due to the fact that the overall magnetic head is composed of a magnetic material. Accordingly, to achieve low inductance, a magnetic, circuit should be made small. From this point of view, U.S. Pat. No. 3,562,444 discloses a flying-type composite magnetic head in which a magnetic core is embedded in and fixed to a non-magnetic slider, without constituting the entire magnetic head with a magnetic material.

Further, the present inventors proposed in Japanese Patent Laid-Open No. 61-199219 a flying-type magnetic head in which a magnetic core is embedded in a non-magnetic slider.

It has been found from the above that to obtain a flying-type composite magnetic head having good recording characteristics to high-coercive force recording media and small inductance, a magnetic core should be constituted by a Mn-Zn ferrite substrate with a high saturation magnetic flux density Bs and coated with a thin magnetic layer having high Bs in its magnetic gap portion, and such magnetic core should be embedded in a non-magnetic slider. An example of such magnetic heads is shown in Japanese Patent Laid-Open No. 60-154310 by the present inventors.

Further, Japanese Patent Laid-Open No. 61-199217 proposed a magnetic head in which a magnetic gap portion of a magnetic core is in an X-shape. In this X-shaped magnetic gap, however, each core piece has a sharp tip portion coated with a high-Bs magnetic thin layer and ground in parallel for defining the magnetic gap. Accordingly, to obtain a desired track width, the high-Bs magnetic thin layer should have a somewhat large thickness.

Further, to obtain a high-performance flying-type composite magnetic head, it is important to maintain a stable floating height in the course of the rotation of a magnetic disk.

While the magnetic disk is rotating, the air on the surface of the magnetic disk also moves to exert an upward force to a lower surface of the slider. Accordingly, the magnetic head floats from the magnetic disk during the rotation of the magnetic disk. The distance of the magnetic head from the magnetic disk is called a floating height, and the floating height is decreasing year after year because of the increase in recording density of magnetic disk apparatuses. According to Computer Strage Industry Service [Section of Rigid Disk Drive] issued by Dataquest, 1984, pp. 2.2–6, the floating height has reached to 10 microinches [0.25 μm]. To keep such a submicron floating height stable during the rotation of the magnetic disk, an air-bearing surface of the magnetic head should have good flatness. Since the floating of the magnetic head is obtained by an air flow passing through a gap between the floating surface of the magnetic head [lower surface of the slider] and an upper surface of the recording medium, stable floating cannot be achieved without good flatness of the floating surface of the magnetic head.

In the case of a magnetic head disclosed in U.S. Pat. No. 3,823,416, since the air-bearing surface acting to cause the floating of the magnetic head is constituted by a single body made of Ni-Zn ferrite or Mn-Zn ferrite, good flatness is easily achieved. However, in the case of a composite magnetic head obtained by embedding a magnetic core in a slit of a non-magnetic slider, fixing the magnetic core with glass and then grinding and polishing its air-bearing surface, special attention should be paid to improve its flatness. This is due to the fact that it is extremely difficult to grind the air-bearing surface to such an extent that the magnetic core and the bonding glass are completely in the same plane as the non-magnetic slider.

Thus, the desired characteristics of a magnetic head for use with a magnetic disk are [1] sufficient recordability to high-coercive force media, [2] low inductance, [3] high reproduced output without causing undulation due to extreme strain in a high Bs magnetic layer, and [4] excellent CSS characteristics.

SUMMARY OF THE INVENTION

Accordingly, an object of the present invention is to provide a flying-type composite magnetic head which has solved the above problems.

As a result of intense research in view of the above object, it has been found that by constituting a magnetic head by a pair of core pieces whose opposing surfaces are flat, by providing the magnetic core in its track surface with a notch for restricting a track width, by restricting the depth of the notch to a particular restricted range, and by fixing the magnetic core in a slit of a non-magnetic slider with a glass layer having a sufficient thickness filled on both sides of the magnetic core, a flying-type composite magnetic head having good flatness in its air-bearing surface, as well as the above characteristics can be obtained. The present invention is based on this finding.

Thus, the flying-type composite magnetic head according to the present invention comprises a slider made of a non-magnetic ceramic and having side rails extending longitudinally on both lateral sides of the head; a slit extending longitudinally in one of the side rails; and a magnetic core constituted by a pair of core pieces bonded to each other with a first glass and fixed in the slit with a second glass, in which [a] flat opposing surfaces of the core pieces are parallel to each other for defining a magnetic gap; [b] at least one of the opposing surfaces is formed with an Fe-Al-Si thin layer; [c] the magnetic core is provided in its track surface with a notch extending perpendicular to the magnetic gap for restricting or defining a track width, the notch having a depth equal to or greater than the depth of the magnetic gap, and the remaining thickness of the first glass bonding the magnetic core pieces being equal to or greater than the thickness of the magnetic core: and [d] the magnetic core is fixed in the slit with the second glass filled on both sides of the magnetic core.

DETAILED DESCRIPTION OF THE PREFERRED EMBODIMENTS

The present invention will be explained in detail referring to the attached drawings.

Figure 1:
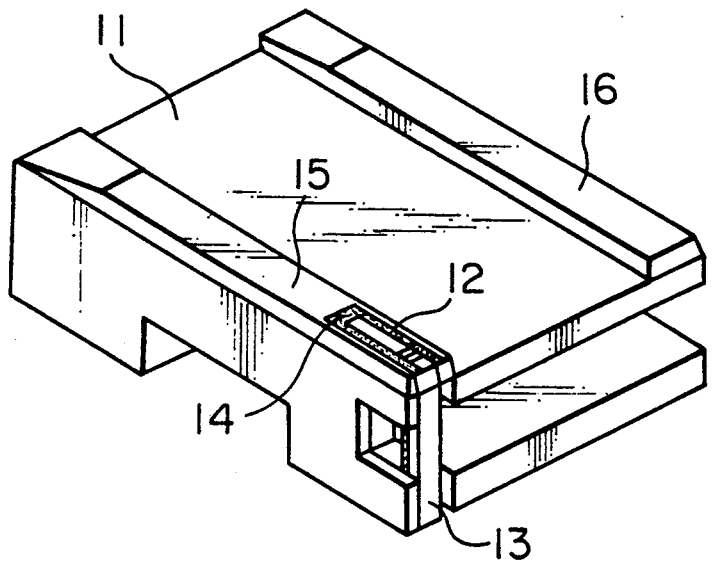
FIG. 1 is a perspective view showing a flying-type composite magnetic head according to one embodiment of the present invention.

FIG. 1 shows the entire structure of the flying-type composite magnetic head according to one embodiment of the present invention. The flying-type composite magnetic head comprises a non-magnetic slider 11, a slit 12 extending longitudinally in one of side rails 15, 16 of the slider 11, a magnetic core 13 embedded in the slit 12 and a glass layer 14 for fixing the magnetic core 13 in the slit 12. Since the magnetic core 13 is fixed to a tail end portion of one of the side rails 15, 16 [side rail 15 in FIG. 1] of the non-magnetic slider 11, it is important that a side rail portion where the magnetic core 13 is embedded and fixed has good flatness to achieve stable floating. Incidentally, the slider 11 is desirably made of a non-magnetic ceramic such as $CaTiO_3$ having a thermal expansion coefficient of $105-115 \times 10^{-7}/°$ C. and a porosity of 0.5% or less.

Figure 2:
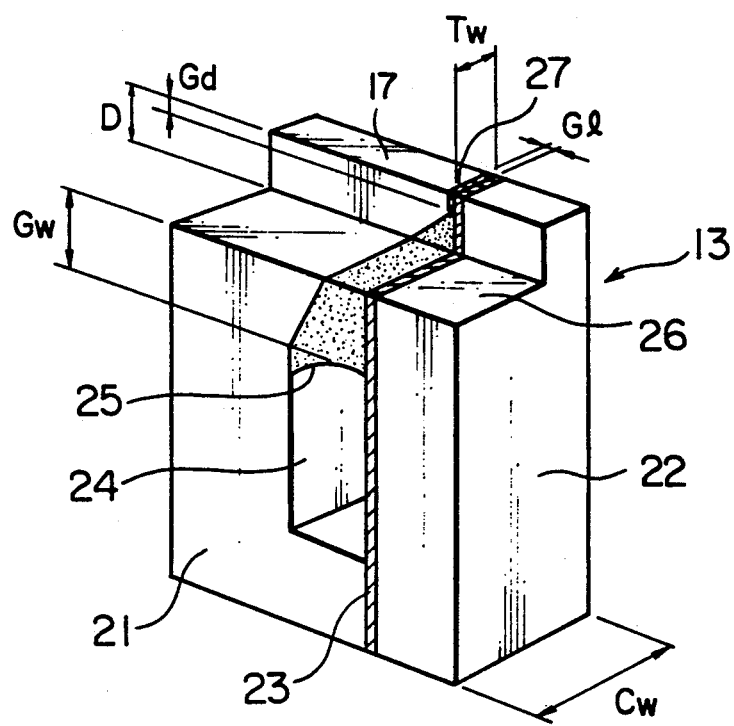
FIG. 2 is a perspective view showing one example of a magnetic core to be assembled in the flying-type composite magnetic head of FIG. 1.

FIG. 2 is an enlarged perspective view of the magnetic core 13. The magnetic core 13 is constituted by a C-shaped core piece 21 and an I-shaped core piece 22 both made of Mn-Zn ferrite, and an Fe-Al-Si thin layer 23 formed on the I-shaped core piece. The core 13 has a space called a window 24 for coil-winding, which is defined by the C-shaped core piece 21 and the I-shaped core piece 22. An upper portion of the coil-winding window 24 is filled with a first glass layer 25 for bonding the C-shaped core piece 21 and the I-shaped core piece 22. The core pieces 21 and 22 have flat opposing surfaces parallel to each to form a magnetic gap as further described below.

The magnetic core 13 is provided with a track surface 17 [a top surface of magnetic core 13 as depicted in FIGS. 1 and 2] with a notch 26 extending longitudinally in the magnetic core 13 for restricting or defining track width Tw for the track surface 17 and a magnetic gap width 27 formed therein. Magnetic gap 27 is formed between the two parallel opposing surfaces of the core pieces in the track surface of the core 13. This notch 26 extends longitudinally in the magnetic core 13 and thus perpendicular to the width Tw and magnetic gap 27. With this notch 26, the track width Tw of the magnetic gap 27 can be set arbitrarily and with precision. With respect to the notch depth D, it should be larger than the depth Gd of the magnetic gap 27 and sufficiently smaller than the thickness Gw of the bonding glass 25 as explained below in detail. Incidentally, the magnetic gap 27 is provided with a gap length-defining layer, such as an $SiO_2$ layer, etc. formed by sputtering, etc.

In the magnetic core 13 of the present invention, the relation between the depth D of the notch 26 and the depth Gd of the magnetic gap 27, and the relation between the remaining thickness Gw of the bonding glass 25 after formation of notch 26 and the thickness Cw of the magnetic core 13 should meet the following requirements:

$$D \geq \qquad (1)$$

$$Gw \geq Cw \qquad (2)$$

With respect to the relation [1], when the depth D of the notch 26 is smaller than the gap depth Gd, sufficient effect by restricting the track width Tw cannot be obtained. Namely, since the head tip end has too small magnetic resistance, magnetic flux leaking from the tip end of the gap decreases, resulting in lower recording efficiency.

With respect to the relation [2], when the remaining thickness Gw of the bonding glass 25 is smaller than the thickness Cw of the magnetic core 13, cracking is likely to take place in the bonding glass layer 25 in the step of working the magnetic core 13, and the bonding of the two core pieces 21, 22 becomes unstable in the step of fixing the magnetic core 13 in the slit of the slider.

To achieve higher recording density, the gap length Gl and the track width Tw are decreasing, and at present those used for rigid disk drives have Gl of 1 μm or less and TW of 20 μm or less. On the other hand, the magnetic core 13 has a thickness Cw of 0.1–0.2 mm or so. In the magnetic core having such sizes of Tw and Cw, it is preferable, under the conditions of the above relation requirements [1] and [2] being substantially met, that the gap depth Gd is 2–20 μm, the notch depth D is 20–200 μm and the thickness Gw of the bonding glass layer 25 is 150–700 μm.

This magnetic head can be produced by the following steps. First, ferrite blocks for producing the I-shaped core piece and the C-shaped core piece are prepared. These ferrite blocks are desirably made of Mn-Zn ferrite having high Bs and extremely high permeability at high frequency. In addition, to reduce voids which tend to appear in the glass during the process of glass bonding, the ferrite blocks are desirably given high density by means of a hot isostatic press method. Particularly preferred is Mn-Zn polycrystalline ferrite with $B_{10}$=4700–5400 G, Hc=0.1–0.2 Oe, a permeability of 800–1300 at 5 MHz, a porosity of 0.5% or less and a thermal expansion coefficient of $105-120\times 10^{-7}/°$ C. However, a single crystal ferrite can be used instead of polycrystalline ferrite.

The I-shaped core block is provided with an Fe-Al-Si thin layer by sputtering. As sputtering conditions, 5–12 mTorr of Ar gas pressure is desirable to maintain stable discharge. To prevent the cracking of an Fe-Al-Si alloy target due to a temperature increase and to obtain a thin film formation speed of about 800 Å/min, electric power is desirably 600–1200 W in the case of a target of 150 mm in diameter. To achieve high permeability, the composition of the Fe-Al-Si layer is desirably 83–86% of Fe, 5–8% of Al and 8–11% of Si by weight. To obtain a small magnetostriction constant, it is desired that Fe is 83.5–85%, Al is 5–7%, and Si is 9–10.5% by weight. To improve its corrosion resistance, the Fe-Al-Si thin layer may contain a small amount of additives. In this case, it is desired to add 2 weight % or less of Ti, Ru, Cr, etc. alone or in combination.

Figure 3:
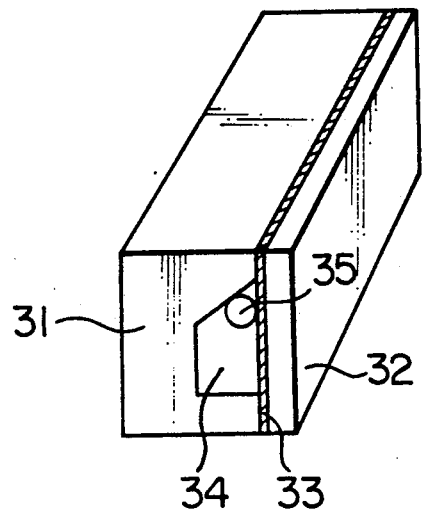
FIG. 3 is a perspective view showing the assembled core blocks whose coil-winding window receives a glass rod for bonding the core blocks.

Next, as is shown in FIG. 3, the I-shaped core block 32 coated with the Fe-Al-Si thin layer 33 is brought into contact with the C-shaped core block 31, and a glass rod 35 is inserted into the resulting window 34 for coil winding and melted therein. In this case, it is preferable that the bonding glass has a softening point of 540°–630° C. and a thermal expansion coefficient of $94-103\times 10^{-7}/°$ C.

As the bonding glass [first glass] showing such characteristics, there may be many combinations of PbO-$SiO_2$ as main components and other various elements. The experiments of the inventors have revealed that a glass composition [a] comprising PbO-$SiO_2$ and one or more alkali metal oxides [$K_2O$, $Li_2O$, $Na_2O$, etc.]; a glass composition [b] comprising PbO-$SiO_2$-$B_2O_3$ and one or more alkali metal oxides; and a glass composition [c] comprising PbO-$SiO_2$-$B_2O_3$-$Al_2O_3$ and one or more alkali metal oxides are suitable. In these glass compositions [a], [b], the preferred compositions are, by weight, 28–49% of $SiO_2$, 44–59% of PbO and 7–13% of at least one alkali metal oxide for [a], or 28–49% of $SiO_2$, 5–15% of $B_2O_3$, 7–13% of at least one alkali metal oxide and balance substantially PbO for [b]. The last composition [c] is 28–49% of $SiO_2$, 5–15% of $B_2O_3$, 5–12% of $Al_2O_3$, 7–13% of at least one alkali metal oxide and the balance substantially PbO. Particularly, a preferred example of the first glass is, by weight %, 40 PbO-37 $SiO_2$-13 $B_2O_3$-10 $Na_2O$ which has a softening point of 560° C. and a thermal expansion coefficient of $95\times 10^{-7}/°$ C. When the magnetic core pieces are bonded with such first glass, the bonding strength of the magnetic core is as high as 5 kg/mm², without causing any corrosion of the Fe-Al-Si thin layer.

$B_2O_3$ has a function to prevent the corrosion of the glass in a highly humid condition. However, when $B_2O_3$ is excessive, the wettability of the Fe-Al-Si thin layer or the ferrite core by the glass decreases, resulting in insufficient bonding strength. $Al_2O_3$ has a function to prevent the discoloration of the glass at high temperature. However, when it is excessive, the glass has a too high softening point, making it unable to achieve easy bonding. In addition, alkali metal oxides have a function to adjust the fluidity of the glass.

The bonding of the core blocks with such first glass is conducted at 700°–760° C. By cutting the bonded blocks, a magnetic core can be obtained.

Figure 4:
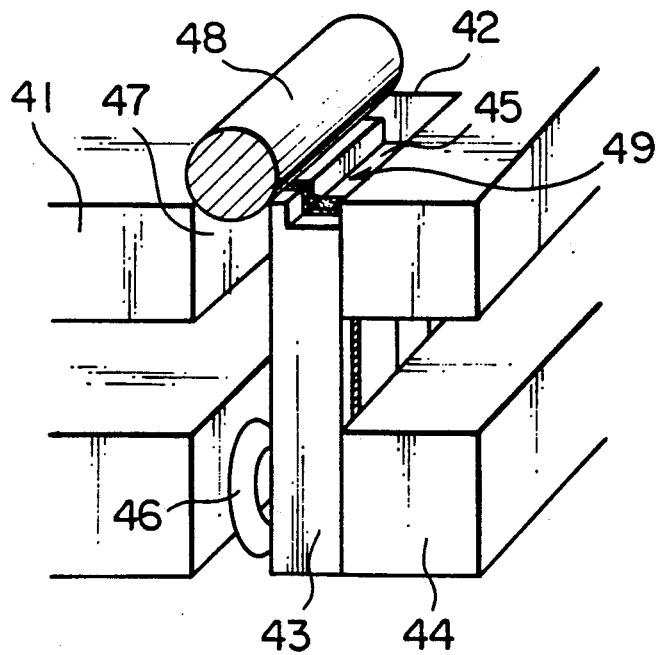
FIG. 4 is a perspective view showing the step of filling the slit in a slider on the sides of a magnetic core with a second glass to produce the flying-type composite magnetic head of FIG. 1.

The fixing of this magnetic core to the slit of the slider is conducted as follows. FIG. 4 is a perspective view showing a state in which the bonded magnetic core 43 is placed in a slit 42 of the slider 41, and a glass rod 48 is placed on the slider 41 over the slit 42. Since a notch 45 of the magnetic core 43 faces an outside portion 44 of the slider 41, there are gaps 47, 49 between the magnetic core 43 and the inner surfaces of the slit 42, even when the magnetic core 43 is in forced contact with the inner surface of the outside portion 44. The provisional fixing of the core 43 in the slit 42 is achieved easily by a spring member 46 forcefully inserted in a gap between one side of the magnetic core 43 and the opposing inner surface of the slit 42. The glass rod 48 is to constitute a second glass layer for fixing the magnetic core 43 to the slit 42. Preferably, the second glass is a glass which has a thermal expansion coefficient of $87-96\times 10^{-7}/°$ C. and a softening point of 370°–480° C. or so. The glass composition showing such properties is 70–83% of PbO, 3–10% of $Al_2O_3$, 4–10% of $SiO_2$ and 4–10% of $B_2O_3$ by weight. By heating this glass rod 48 at a temperature of 500°–580° C., it flows into the gaps 47, 49.

One example of a particularly preferred glass composition for the second glass layer is 80 PbO-7 $Al_2O_3$-6 $SiO_2$-7 $B_2O_3$ [by weight %]. This glass has a thermal expansion coefficient of $93\times 10^{-7}/°$ C. and a softening point of 440° C. By conducting the fixing of the magnetic core with this second glass at 530° C., fixing without cracks can be achieved.

After fixing the magnetic core 43 in the slit 42, the air-bearing surface of the magnetic head is ground and mirror-finished.

As is clearly shown in FIG. 4, a gap between the magnetic core 43 and one inner surface of the slit 42 of the slider 41 is zero in the lower portion of the magnetic core 43, namely, the magnetic core 43 is in contact with one inner surface of the slit 42 of the slider 41 in its lower portion, while it has a sufficient width in an upper portion thereof as shown by reference numeral 49. By this structure, the magnetic core 43 is precisely positioned and strongly fixed in the slit 42 with the second glass layers provided on both sides of the magnetic core 43.

The present invention will be explained in further detail by means of the following Examples.

EXAMPLE 1

A magnetic core having a structure shown in FIG. 2 was produced by using a C-shaped core piece and an I-shaped core piece both made of Mn-Zn polycrystalline ferrite. The Mn-Zn polycrystalline ferrite was compressed by a hot isostatic pressing method to have a porosity of 0.1%, and it had magnetic properties in which $B_{10}=5100$ G, $Hc=0.15$ Oe and permeability at 5 MHz=950. Further, it had a thermal expansion coefficient of $115\times 10^{-7}/°$ C.

Each of the C-shaped core block and the I-shaped core block was formed by using a peripheral slicer, and ground with a flat grinder and then lapped. After lapping, each core block was boiled in trichloroethylene, and then subjected to ultrasonic cleaning in trichloroethylene, acetone and alcohol, respectively. After that, it was boiled in freon and finally washed in a freon vapor.

An Fe-Al-Si thin layer was formed on the I-shaped core block by a magnetron sputtering apparatus. The electric power of the magnetron sputtering apparatus was 0.8 kW, its argon pressure was 8 mTorr, and its substrate temperature was 200° C. The Fe-Al-Si thin layer had a composition of 85% Fe, 6% Al and 9% Si by weight. It also had a thickness of 2.9 μm. This thin layer had the following characteristics: $Bs=11,000$ G, $Hc=0.3-0.5$ Oe, permeability at 5 MHz=1,000-2,000 and magnetostriction constant $=+1\times 10^{-6}$.

Next, the I-shaped core block formed with the Fe-Al-Si thin layer was then placed in an RF sputtering apparatus to produce an $SiO_2$ gap length-defining layer of 0.5 μm in thickness on the Fe-Al-Si thin layer at an electric power of 0.3 kW, argon pressure of 5 mTorr and substrate temperature of 150° C.

A first glass for bonding the C-shaped core piece and the I-shaped core piece had the following composition:

| | |
|---|---|
| PbO | 40 weight % |
| $SiO_2$ | 37 weight % |
| $B_2O_3$ | 13 weight % |
| $Na_2O$ | 10 weight % |

This first glass had a softening point of 560° C. and a thermal expansion coefficient of $95\times 10^{-7}/°$ C. The bonding of the core blocks with the first glass was conducted by heating them in an electric furnace filled with a nitrogen gas to 700° C. at a heating rate of 300 ° C./hr, and keeping them at 700° C. for 30 minutes.

The core blocks thus bonded were ground by a flat grinder and then lapped, and finally cut into each magnetic core of 152 μm in thickness by a wire saw.

Next, to restrict the track width Tw of the resulting magnetic core, it was notched by a high-rigidity dicer in a width of 138.5 μm and a depth of 200 μm.

The magnetic core thus notched had the following structure:

| | |
|---|---|
| Thickness of the magnetic core Cw | 152 μm |
| Track width Tw | 13.5 μm |
| Gap length Gl | 0.5 μm |
| Thickness of bonding glass Gw | about 200 μm |

A slider made of a $CaTiO_3$ ceramic having a thermal expansion coefficient of $108\times 10^{-7}/°$ C. and a porosity of 0.15% was formed with a slit of 1.5 mm in length and 220 μm in width at one end of one side rail thereof, and the magnetic core was provisionally fixed in the slit with a leaf spring. It was then fixed with the following second glass:

| | |
|---|---|
| PbO | 78 weight % |
| $SiO_2$ | 6 weight % |
| $Al_2O_3$ | 7 weight % |
| $B_2O_3$ | 7 weight % |

The second glass had a thermal expansion coefficient of $91\times 10^{-7}/°$ C. and a softening point of 440° C. This glass was heated in an electric furnace filled with $N_2$ at a heating rate of 300 ° C./hour, and kept at a temperature of 540° C. for 30 minutes, so that it flowed into gaps between the magnetic core and the inner surfaces of the slit. The magnetic head thus produced was ground and lapped with a mirror-finishing grinder and a lapping machine on its air-bearing surface, thereby providing a flying-type composite magnetic head of the present invention. By these grinding and lapping operations, the notch finally had a depth D of 75 μm. The magnetic gap depth Gd was 4 μm after grinding the air-bearing surface. Incidentally, the gaps between the inner surfaces of the slit and both sides of the magnetic core were 68 μm and 138.5 μm, respectively.

Reproduced output characteristics and other head characteristics at 2.5 MHz were measured on this magnetic head, by using a 5.25-inch magnetic disk having a Co-Ni sputtered recording layer [Hc=1150 Oe], with a floating height of 0.3 μm and a peripheral speed of 12.1 m/sec. For comparison, a conventional composite magnetic head having no Fe-Al-Si thin layer was also measured. The results are shown in Table 1.

TABLE 1

| | Magnetic Head | |
|---|---|---|
| | A[1] | B[2] |
| 2F Output[3] (mVp-p) | 0.66 | 0.50 |
| Resolution (%) | 94 | 92 |
| O/W[4] (dB) | 36 | 24 |
| D50[5] (KFCI) | 25 | 16 |
| Thickness (μm) of Fe—Al—Si Thin Layer | 2.9 | — |

Figure 5:
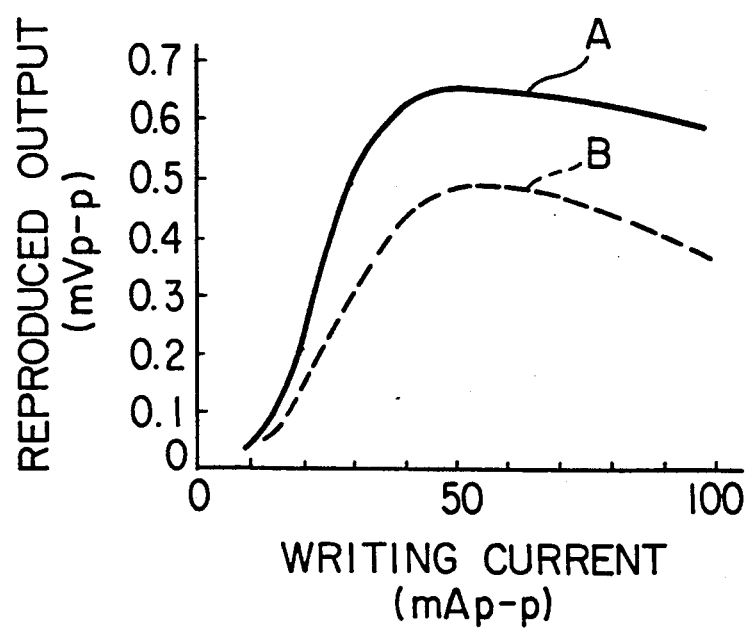
FIG. 5 is a graph showing the relations between writing current and reproduced output voltage.

Note
[1]: Present invention
[2]: Conventional one
[3]: Output voltage at 2.5 MHz
[4]: Overwrite characteristic
[5]: Recording density limit With respect to the magnetic head [A] of the present invention and the conventional magnetic head [B], the relations between the writing current to the above magnetic disk and the reproduced output voltage were measured. The results are shown in FIG. 5.

From the above comparisons, it is clear that the magnetic head of the present invention is superior to the conventional one with respect to reproduced output characteristics and head characteristics.

EXAMPLE 2

With the magnetic core of Example 1, in which the thickness of the bonding glass was varied, the cracking of the bonding glass after forming a notch was investigated. The results are shown in Table 2.

TABLE 2

| | Thickness of Bonding Glass (μm) | | | | |
|---|---|---|---|---|---|
| | 80 | 100 | 150 | 200 | 300 |
| Cracking Yield (%) | X ≦30 | X ≦50 | O ≧90 | ⊚ ≧95 | ⊚ ≧95 |

Note
X: Extreme cracking
O: Slight cracking
⊚: No cracking

It is clear from Table 2 that where the thickness of the bonding glass is 80-100 μm [substantially smaller than the thickness of the core], cracking takes place in the bonding glass at the time of forming the notch for restricting the track width, resulting in lower yield.

EXAMPLE 3

Magnetic cores were produced in the same manner as in Example 1 except for changing the thickness of the Fe-Al-Si thin layer to 3 μm, 8 μm, 12 μm, respectively. The peeling of the Fe-Al-Si thin layer and the detachment of crystal particles from the magnetic core at the time of forming a notch were investigated. Further, the resulting magnetic cores were used to produce magnetic heads, which were then used together with the same magnetic disk as in Example 1 to measure their reproduced output characteristics. The results are shown in Table 3.

TABLE 3

| | Sample No. | | |
|---|---|---|---|
| | 1 | 2 | 3 |
| Fe—Al—Si Layer Thickness (μm) | 3 | 8 | 12 |
| 2F Output (mVp-p) | 0.68 | 0.68 | 0.58 |
| Resolution (%) | 94 | 94 | 90 |
| O/W (dB) | 37 | 37 | 32 |
| D50 (KFCI) | 26 | 26 | 19 |
| Peeling of Thin Layer[1] | O | O | X |
| Detachment of Particles from Core Substrate[2] | O | O | Δ |

Note
(1):
O: No peeling of Fe—Al—Si thin layer.
X: Extremely peeling of Fe—Al—Si thin layer.
(2):
O: No detachment of particles from Mn—Zn ferrite core substrate.
Δ: Slight detachment of particles from Mn—Zn ferrite core substrate.

As is clear from the above results, when the thickness of the Fe-Al-Si thin layer is 3 μm or 8 μm, there is no problem in the working of the magnetic core, and the resulting magnetic head has good characteristics. On the other hand, when the thickness of the Fe-Al-Si thin layer is 12 μm, its peeling and the detachment of the core particles take place in the step of working the magnetic cores, and the resulting magnetic head shows poor reproduced output characteristics. This is due to the fact that since the Fe-Al-Si thin layer is too thick, large stress is generated along the boundary between the core substrate and the Fe-Al-Si thin layer because of their large difference in thermal expansion coefficient, causing the peeling of the thin layer and the detachment of the core substrate.

EXAMPLE 4

Each magnetic core was produced in the same manner as in Example 1, and two different depths of notches for restricting track width were formed on the resulting magnetic cores. The depths of the notches were respectively 2 μm and 165 μm. With these magnetic cores, magnetic heads were produced in the same manner as in Example 1. The resulting magnetic heads had the following sizes:

| | |
|---|---|
| Magnetic core width Cw | 152 μm |
| Track width Tw | 13.5 μm |
| Gap length Gl | 0.55 μm |
| Gap depth Gd | 5 μm |
| Thickness of Fe—Al—Si Layer | 2.9 μm |
| Thickness of bonding glass | about 200 μm |
| Number of winding of coil N | 42 turns |

With these magnetic heads, head characterized were measured by using the same magnetic disk as in Example 1. The results are shown in Table 4.

TABLE 4

| | Magnetic Head[1] | |
|---|---|---|
| | A | B |
| 2F Output (mVp-p) | 0.66 | 0.52 |
| Resolution (%) | 94 | 92 |
| O/W (dB) | 36 | 31 |
| D50 (KFCI) | 26 | 22 |
| Exceeding Writing Width[2] (μm) | 0.5 | 1.2 |
| L (μm)[3] | 6.0 | 7.04 |
| fo (MHz)[4] | 25.0 | 22.4 |

Note
(1):
A: Magnetic head with magnetic core having 165-μm-deep notch.
B: Magnetic head with magnetic core having 2-μm-deep notch.
(2): Writing width outside Tw
(3): Inductance at 3 MHz
(4): Resonance frequency As is clear from the above results, when the notch depth D is smaller than the gap depth Gd, magnetic head shows poor reproduced output characteristics as well as poor head characteristics. This is due to the fact that since the notch is too shallow, the head tip portion has too small magnetic resistance, resulting in the decrease in the magnetic field leaking from the tip portion of the gap, which in turn leads to the reduction of recording efficiency. On the other hand, when the notch has a sufficient depth D [larger than the core width], excellent magnetic properties can be obtained.

As described above in detail, the flying-type composite magnetic head of the present invention is of the so-called "parallel-type", has a notch in its track surface for restricting a track width, the notch having a depth equal to or greater than the gap depth, the remaining thickness of the bonding glass being equal to or greater than the width of the magnetic core, and the magnetic core being fixed in a slit of a non-magnetic slider with glass layers on both sides of the magnetic core. Accordingly, it not only shows good head characteristics, but also can be produced easily with high precision. In addition, since both sides of the magnetic core are fixed to the slit of the slider with glass layers, good flatness is provided on the air-bearing surface of the magnetic head.

What is claimed is:

1. A flying-type composite magnetic head comprising:
    (a) a slider made of a non-magnetic ceramic material and having side rails extending longitudinally on both lateral sides of said head, one of said rails having a slit extending longitudinally therein; and
    (b) a magnetic core fixable in said slit and including—

(i) a pair of core pieces having flat opposing surfaces parallel to each other for defining a magnetic gap, (ii) an Fe-Al-Si thin layer formed on one of said flat opposing parallel surfaces of said core pieces, (iii) a first glass layer for bonding said pair of core pieces together, (iv) a second glass layer for fixing said magnetic core in said slit, said second glass layer filling the slit on sides of said magnetic core, and (v) a track surface on said magnetic core having a track width defined by a notch longitudinally formed in said magnetic core, said magnetic gap and said notch having depths wherein the depth of the notch is equal to or greater than the depth of said magnetic gap, and said magnetic core having a thickness and said first glass layer having a remaining thickness after bonding of the core pieces and forming of the notch wherein the remaining thickness of said first glass layer is equal to or greater than the thickness of said magnetic core.

2. The flying-type composite magnetic head according to claim 1, wherein said slider is made of $CaTiO_3$.

3. The flying-type composite magnetic head according to 2, wherein said second glass layer for fixing said magnetic head in said slit has a thermal expansion coefficient of $87-96 \times 10^{-7}/°$ C. and a softening point of $270°-480°$ C., and said slider is made of $CaTiO_3$ having a thermal expansion coefficient of $105-115 \times 10^{-7}/°$ C.

4. The flying-type composite magnetic head according to claim 1, wherein said Fe-Al-Si thin layer has a thickness of 10 $\mu$m or less.

5. The flying-type composite magnetic head according to 4, wherein said second glass layer for fixing said magnetic head in said slit has a thermal expansion coefficient of $87-96 \times 10^{-7}/°$ C. and a softening point of $370°-480°$ C., and said slider is made of $CaTiO_3$ having a thermal expansion coefficient of $105-115 \times 10^{-7}/°$ C.

6. The flying-type composite magnetic head according to claim 1, wherein said core pieces of said magnetic core are made of Mn-Zn ferrite.

7. The flying-type composite magnetic head according to 6, wherein said second glass layer for fixing said magnetic head in said slit has a thermal expansion coefficient of $87-96 \times 10^{-7}/°$ C. and a softening point of $370°-480°$ C., and said slider is made of $CaTiO_3$ having a thermal expansion coefficient of $105-115 \times 10^{-7}/°$ C.

8. The flying-type composite magnetic core according to claim 1, wherein said pair of core pieces comprise a C-shaped core piece and an I-shaped core piece, the thickness of said first glass layer for bonding said C-shaped core piece and said I-shaped core piece in the direction of the notch depth being equal to or greater than the thickness of said magnetic core.

9. The flying-type composite magnetic head according to 8, wherein said second glass layer for fixing said magnetic head in said slit has a thermal expansion coefficient of $87-96 \times 10^{-7}/°$ C. and a softening point of $370°-480°$ C., and said slider is made of $CaTiO_3$ having a thermal expansion coefficient of $105-115 \times 10^{-7}/°$ C.

10. The flying-type composite magnetic head according to claim 1, wherein said track width of said magnetic core is 3-20 $\mu$m.

11. The flying-type composite magnetic head according to 10, wherein said second glass layer for fixing said magnetic head in said slit has a thermal expansion coefficient of $87-96 \times 10^{-7}/°$ C. and a softening point of $370°-480°$ C., and said slider is made of $CaTiO_3$ having a thermal expansion coefficient of $105-115 \times 10^{-7}/°$ C.

12. The flying-type composite magnetic head according to claim 1, wherein said magnetic core has a thickness of 100-200 $\mu$m.

13. The flying-type composite magnetic head according to 12, wherein said second glass layer for fixing said magnetic head in said slit has a thermal expansion coefficient of $87-96 \times 10^{-7}/°$ C. and a softening point of $370°-480°$ C., and said slider is made of $CaTiO_3$ having a thermal expansion coefficient of $105-115 \times 10^{-7}/°$ C.

14. The flying-type composite magnetic head according to claim 1, wherein said first glass layer for bonding said pair of core pieces contains 28-49 weight % of $SiO_2$.

15. The flying-type composite magnetic head according to 14, wherein said second glass layer for fixing said magnetic head in said slit has a thermal expansion coefficient of $87-96 \times 10^{-7}/°$ C. and a softening point of $370°-480°$ C., and said slider is made of $CaTiO_3$ having a thermal expansion coefficient of $105-115 \times 10^{-7}/°$ C.

16. The flying-type composite magnetic head according to claim 14, wherein said first glass layer is substantially made of a glass composition comprising 44-59 weight % of PbO, 28-49 weight % of $SiO_2$ and 7-13 weight % of at least one alkali metal oxide.

17. The flying-type composite magnetic head according to 16, wherein said second glass layer for fixing said magnetic head in said slit has a thermal expansion coefficient of $87-96 \times 10^{-7}/°$ C. and a softening point of $370°-480°$ C., and slider is made of $CaTiO_3$ having a thermal expansion coefficient of $105-115 \times 10^{-7}/°$ C.

18. The flying-type composite magnetic head according to claim 14, wherein said first glass layer is substantially made of a glass composition comprising 28-49 weight % of $SiO_2$, 5-15 weight % of $B_2O_3$, 7-13 weight % of at least one alkali metal oxide and balance substantially PbO.

19. The flying-type composite magnetic head according to 18, wherein said second glass layer for fixing said magnetic head in said slit has a thermal expansion coefficient of $87-96 \times 10^{-7}/°$ C. and a softening point of $370°-480°$ C., and said slider is made of $CaTiO_3$ having a thermal expansion coefficient of $105-115 \times 10^{-7}/°$ C.

20. The flying-type composite magnetic head according to claim 14, wherein said first glass layer is substantially made of a glass composition comprising 28-49 weight % of $SiO_2$, 5-15 weight of $B_2O_3$, 5-12 weight % of $Al_2O_3$, 7-13 weight % of at least one alkali metal oxide and a remaining weight % balance substantially of PbO.

21. The flying-type composite magnetic head according to 20, wherein said second glass layer for fixing said magnetic head in said slit has a thermal expansion coefficient of $87-96 \times 10^{-7}/°$ C. and a softening point of $370°-480°$ C., and said slider is made of $CaTiO_3$ having a thermal expansion coefficient of $105-115 \times 10^{-7}/°$ C.

22. The flying-type composite magnetic head according to claim 1, wherein said second glass layer for fixing said magnetic head in said slit has a thermal expansion coefficient of $87-96 \times 10^{-7}/°$ C. and a softening point of $370°-480°$ C., and said slider is made of $CaTiO_3$ having a thermal expansion coefficient of $105-115 \times 10^{-7}/°$ C.

23. The flying-type composition magnetic head according to claim 22, wherein said second glass layer is substantially made of a glass composition comprising 70-83 weight % of PbO, 3-10 weight % of $Al_2O_3$, 4-10 weight % of $SiO_2$ and 4-10 weight % of $B_2O_3$.

* * * * *